United States Patent [19]

Miller

[11] 4,181,080
[45] Jan. 1, 1980

[54] SUPPORT STRUCTURE FOR A MAGNETICALLY LEVITATED VEHICLE

[75] Inventor: Luitpold Miller, Ottobrunn, Fed. Rep. of Germany

[73] Assignee: Messerschmitt-Bolkow-Blohm GmbH, Munich, Fed. Rep. of Germany

[21] Appl. No.: 888,003

[22] Filed: Mar. 20, 1978

[30] Foreign Application Priority Data

Mar. 31, 1977 [DE] Fed. Rep. of Germany ....... 2714282

[51] Int. Cl.² ............................................. B61B 13/08
[52] U.S. Cl. .................. 104/148 MS; 104/23 FS; 104/134; 105/144; 267/65 R; 267/65 D
[58] Field of Search ............... 104/148 LM, 148 MS, 104/148 SS, 23 FS, 134; 105/164, 197 B, 199 R, 144, 157 R; 267/3, 65 R, 65 B, 65 D; 180/115, 117

[56] References Cited

U.S. PATENT DOCUMENTS

| 2,691,420 | 10/1954 | Fox et al. ......................... 105/197 B |
| 2,952,224 | 9/1960 | Bachman .......................... 105/197 B |
| 3,687,439 | 8/1972 | Hornsby ............................. 267/65 R |
| 3,939,776 | 2/1976 | Ross et al. ......................... 104/23 FS |
| 3,980,316 | 9/1976 | Yates ................................. 267/65 R |

FOREIGN PATENT DOCUMENTS

| 1800325 | 6/1969 | Fed. Rep. of Germany ...... 104/23 FS |
| 2626439 | 12/1977 | Fed. Rep. of Germany ... 104/148 MS |
| 2626440 | 12/1977 | Fed. Rep. of Germany ... 104/148 MS |

*Primary Examiner*—Randolph A. Reese
*Attorney, Agent, or Firm*—W. G. Fasse; D. F. Gould

[57] ABSTRACT

The body of a magnetically levitated vehicle is carried by a support structure wherein chassis components support the body through first springs and wherein the magnets are secured to the chassis components by second springs. Each of the first and second springs comprise respective bellows filled with fluid. The pressure or volume of the fluid in the second spring bellows is adjustable in response to the fluid pressure or volume in the first spring bellows. For this purpose the second spring bellows communicate operatively with the respective adjacent first spring bellows, preferably through adjustable valves.

11 Claims, 4 Drawing Figures

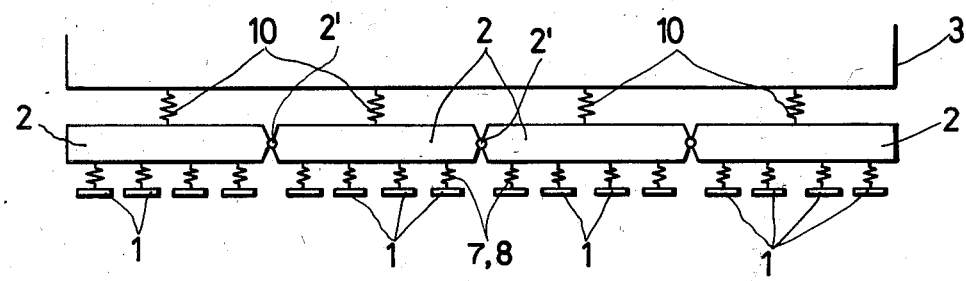
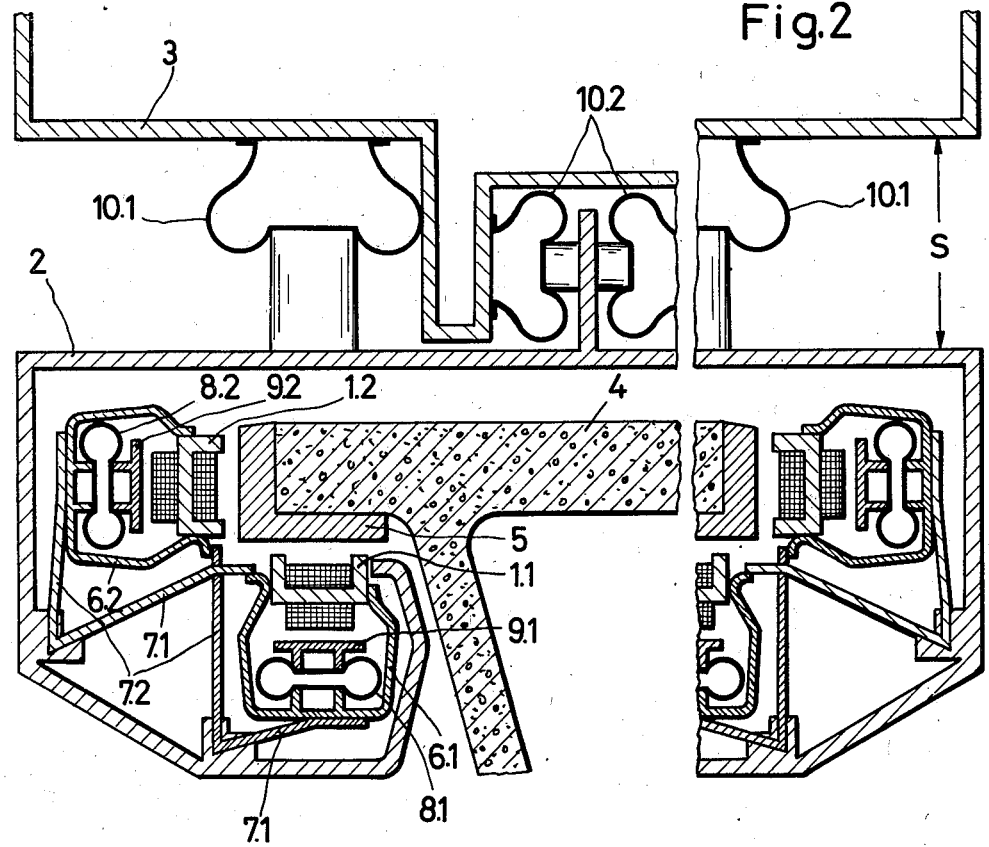

SUPPORT STRUCTURE FOR A MAGNETICALLY LEVITATED VEHICLE

BACKGROUND OF THE INVENTION

The present invention relates to a support structure for a magnetically levitated vehicle. More specifically, the present support structure includes first spring means which support a vehicle body on respective chassis components and second spring means which secure the levitation magnets to the chassis or chassis components.

In prior art efforts to improve the riding characteristics, especially the travelling comfort of magnetically levitated vehicles, so-called secondary spring devices have been inserted between the chassis and the actual superstructure or vehicle body. The chassis also supports the levitation and guide magnets. Such secondary spring devices have been useful in preventing disturbing vibrations of the vehicle superstructure or body. Such vibrations are due to positional faults in the rail structure on which such magnetically levitatedvehicles travel. For example, German Patent Publication (DT-OS) No. 2,342,734 discloses a spring structure which provides a vibration decoupling of the chassis from the vehicle superstructure. In addition to the vibration decoupling, the spring support of the vehicle superstructure results in a smaller dynamic load of the magnets as compared to magnetically levitated vehicles in which the magnets are rigidly secured. However, the resulting reduction in the dynamic loads is satisfactory at best in magnetically levitated railroad systems in which the road bed and rails forming the track system are dynamically rigid and wherein the course of the rails is very precise.

However, such a track system with precisely arranged rails which is dynamically rigid, cannot be considered to be a practical possibility for economic reasons alone. Thus, the track system including the road bed and rail structure, will have to be constructed as an elastic system whereby the rails will be subject to certain positional faults. In vehicles which must run on such track systems it is not possible to achieve a further reduction in the dynamic load of the magnets by means of a so-called spring suspension for each individual magnet. However, such spring suspensions, for each magnet cannot prevent that changes in the static load of the vehicle body affect the position of the vehicle body relative to the chassis and necessarily also the position of the chassis relative to the magnet. As a result it is possible that so-called angular errors or faults of individually affected levitation or guide magnets relative to the track structure may occur, for example, as a result of a load shift due to passenger movements or due to side winds and wind gusts effective on the vehicle superstructure. Hence, it is necessary to take into account undesired feedback effects on the dynamic characteristics of the magnetically levitated vehicle. Such feedback effects impair, on the one hand, the freedom of contact between the magnets and the rail structure and, on the other hand, the travelling comfort for the passengers.

OBJECTS OF THE INVENTION

In view of the above it is the aim of the invention to achieve the following objects singly or in combination:

to avoid that static load changes of the vehicle body or superstructure impair the dynamic travel characteristics of a magnetically levitated vehicle;

to avoid increasing the power consumption for the magnets while still maintaining the desired dynamic travel characteristics of a magnetically levitated vehicle;

to avoid increasing the median or mean rated spacing between the magnets and the rail structure while again maintaining the dynamic travel characteristics of such magnetically levitated vehicles;

to maintain substantially constant the spacing between the magnets and their respective chassis components;

to employ bellows in the spring support structure and to control the fluid pressure in such bellows automatically and proportional to any reduction of the respective magnetic force; and to generally make the dynamic travel characteristics of a magnetically levitated vehicle substantially independent of dynamic or static load variations to which the vehicle may be subject.

SUMMARY OF THE INVENTION

According to the invention the above objects have been achieved by arranging first support spring means between the chassis and the vehicles superstructure and by arranging second spring means for securing the levitation and guidance magnets to the chassis whereby all spring means are controlled in response to load changes on the vehicle body or superstructure, and wherein the spring means supporting the superstructure on the chassis function additionally as control means for the spring means securing the magnets, in response to the respective compensation of any load change. For this purpose it is advantageous to employ spring bellows for the first spring means as well as for the second spring means, whereby the spring bellows for securing the magnet are in operative communication with the next adjacent of the spring means supporting the vehicle superstructure on the chassis.

In the following text the first spring means always refer to the springs between the vehicle body and the chassis or chassis components and the second springs always refer to the means which secure the magnets to the chassis or chassis components.

All the second bellows are preferably of equal size and a force equilibrium is established between the second bellows and the respective first bellows, whereby the pressure of the fluid in the bellows is constant under normal operating load conditions. The pressure is maintained constant by making the effective surface area of the first bellows as large as the sum of the effective surface areas of all second bellows operatively connected to the first bellows.

In addition, the invention provides a common fluid supply for the first and second spring bellows. Thus, the invention while minimizing costs, enforces a constant spacing between the magnets and their chassis or chassis components.

This constant spacing is accomplished for random variations of the static loads of the vehicle superstructure, by a corresponding compensation achieved by supplying or withdrawing of filling fluids, liquid or gas, to the first spring bellows or from the first spring bellows in accordance with said load variations.

The same compensation is accomplished according to a preferred embodiment of the invention wherein the filling fluid for the second spring bellows is supplied from the next adjacent first spring bellows through a respective valve means which is controlled in response to changes in the spacings between the respective magnets and the chassis or chassis components. The preferred embodiment has the advantage that even failure of one magnet out of a group of magnets may be compensated by automatically and proportionally changing the pressure in the remaining second spring bellows of the adjacent magnet in the sense of maintaining the rated spacing of these magnets relative to the chassis. This pressure change in the remaining bellows is proportional to the loss of magnetic force caused by the failure of the magnet. For this purpose the effective surface area of the first bellows is made smaller than the sum of the effective surface areas of the second bellows, whereby under normal operating conditions the pressure in the second bellows is smaller than in the first bellows. For the same purpose, a force equilibrium is established between the second bellows of uniform size on the one hand and the respective first bellows on the other hand. Suitably, the sum of the effective surface areas of the second bellows is made larger right from the start in order to take into account a loss of effective surface area when a magnet fails.

The just described embodiment of the invention may be modified in that the valves of the second bellows are not directly connected to the next adjacent first bellows, but rather, to a special filling fluid supply, the pressure of which depends on the pressure in the first bellows, or rather the pressure of which is adjustable in response to the pressure in the respective first bellows.

BRIEF FIGURE DESCRIPTION

In order that the invention may be clearly understood, it will now be described, by way of example, with reference to the accompanying drawings, wherein:

FIG. 1 is a schematic side view of a magnetically levitated vehicle with the symbolically shown magnets and first spring means between the chassis and vehicle superstructure as well as second spring means between the magnets and the chassis or chassis component.

FIG. 2 is a sectional view through the support structure and the bottom of the superstructure or body, of a magnetically levitated vehicle, wherein the section extends perpendicularly through the longitudinal axis of the vehicle and wherein parts are broken away to accommodate the illustration to the size of the drawing sheet, and wherein structural details of the spring means between the vehicle body and the chassis and between the latter and the magnets are shown;

FIG. 3 illustrated schematically for one half of the vehicle, for simplicity's sake, the two chassis components are arranged along each side of the vehicle half with the respective carrier or levitating magnets and with the respective fluid circuit conduit diagram of the first and second spring bellows means; and FIG. 4 is a view similar to that of FIG. 3, however, showing the arrangement of the guide magnets and the respective fluid circuit conduit diagram of the first and second spring bellows.

DETAILED DESCRIPTION OF PREFERRED EXAMPLE EMBODIMENTS

Figure 3:
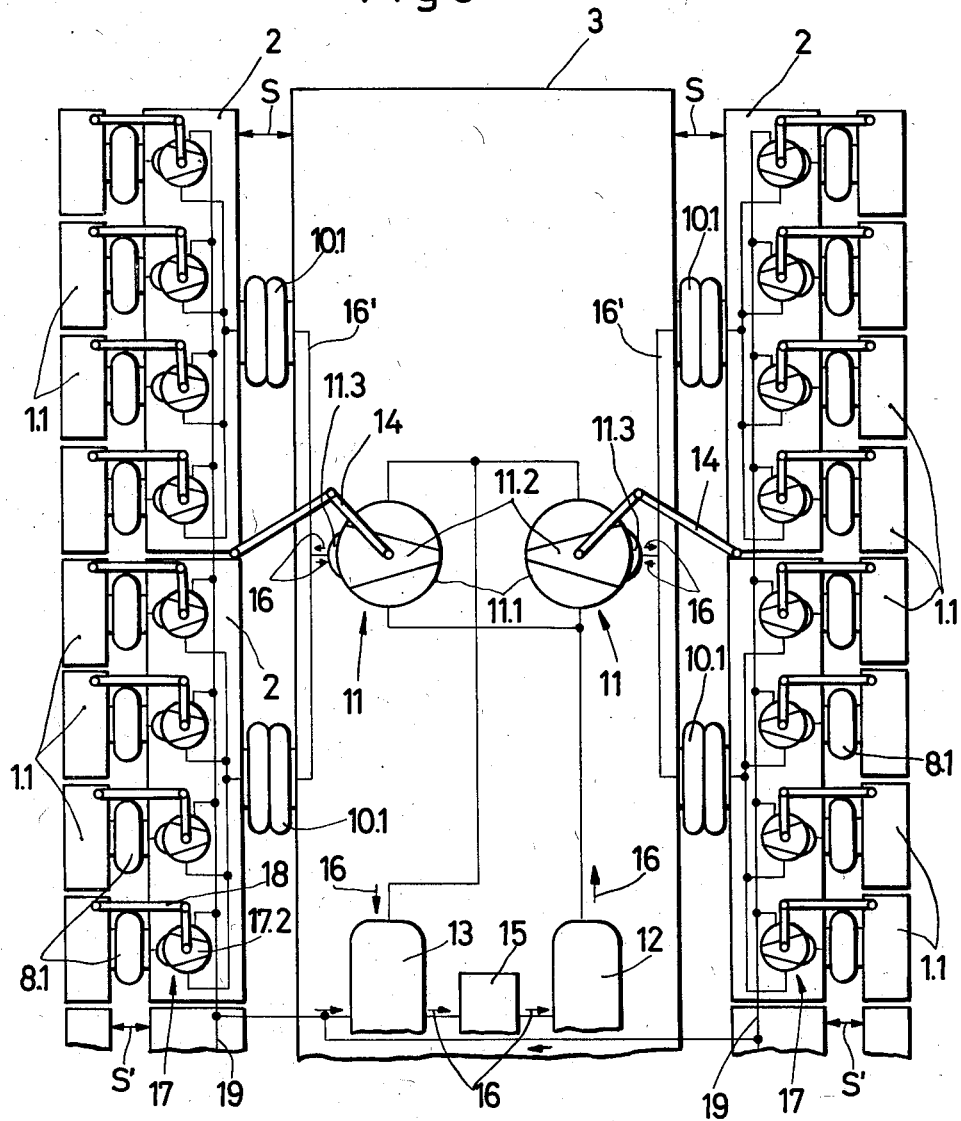

The schematic side view of FIG. 1 shows that the vehicle superstructure or vehicle body 3 is supported by first spring means 10 on a chassis 2 which may comprise a plurality of chassis components. For example, four chassis components are shown in FIG. 1. The magnets 1 are secured through second spring means 7, 8 to the chassis or chassis components 2. The chassis components 2 are coupled to each other by hinge means 2'. The arrangement is such that each magnet is individually spring supported and individually movable.

Structural details are shown in FIG. 2. The carrier magnets 1.1 are secured to the chassis or chassis components 2 so that the magnet levitation forces are vertically effective. The guide magnets 1.2 are secured to the chassis 2 so that the magnet guide forces are horizontally effective. The magnets 1.1 and 1.2 are electromagnets which cooperate with a magnetically conductive rail 5 rigidly supported by the roadway structure 4. The levitation magnets 1.1 are held in respective beam or channel member 6.1. The guide magnets 1.2 are held in the respective beam or channel member 6.2. The beam members 6.1 and 6.2 are made of sectional steel, for example, and are stiff against bending. The beam member 6.1 is secured to the chassis 2 by means of two spring plates 7.1 which extend substantially in parallel to each other and which are held with their one edge in respective holding and reinforcing ribs in the chassis 2. The other edge of the sparing plates 7.1 is secured to the sectional support beam member 6.1, for example, by welding. Similarly, the beam member 6.2 is supported by two spring plates 7.2 also extending substantially in parallel to each other and held with their one edge in said holding and reinforcing ribs of the chassis 2 and secured with their opposite end or edge to the beam 6.2. The spring plates 7.1 and 7.2 are so arranged that their cross sectional view forms a W as best seen in the left hand lower portion of FIG. 2. These spring plates 7.1 and 7.2 are bendable in the direction in which the forces of the respective magnets 1.1 and 1.2 are effective. However, the spring plates 7.1 and 7.2 are rigid relative to pitching and rolling movements thereby securing the magnet.

In addition, each levitation magnet 1.1 and each guide magnet 1.2 is provided with a pneumatic or hydropneumatic spring device including bellows means 8.1 for the levitation magnets 1.1 and bellows meand 8.2 for the guide magnets 1.2. These bellows means are arranged, for example, inside the hollow beam members 6.1 and 6.2 respectively. These bellows 8.1 and 8.2 make it possible to control the spacing between the magnets and the chassis 2. Stated differently, by means of these bellows it is possible to maintain constant the just mentioned spacing "S'" when the static loads on the vehicle body 3 vary. For this purpose the bellows 8.1 is located between the beam member 6.1 and a rail 9.1 which is rigidly secured with its ends, for example, to the chassis 2. Similarly, the bellows 8.2 is interposed between the beam member 6.2 and a rail 9.2 the ends of which are also, for example, rigidly secured to the chassis 2 as by welding. The just described structure makes it possible to generate forces between the respective levitation magnet 1.1 and the respective guide magnet 1.2 and the chassis 2 which are effective in a direction opposite to the effective direction of the magnetic forces of the magnets 1.1 and 1.2.

Referring further to FIG. 2 the first springs 10 are merely shown symbolically in FIG. 1 and are represented in FIG. 2 as bellows spring means 10.1 which are vertically effective and bellows spring means 10.2 which are horizontally effective. These bellows 10.1 and 10.2 are also fillable with a fluid such as a gas or liquid just as the bellows 8.1 and 8.2

The vertically effective spring bellows 10.1 are controlled to maintain the spacing "S" between the chassis 2 and the body 3 constant. The control is responsive to the tendency of this spacing "S" to vary, for example, when the vehicle body is loaded with passengers.

FIG. 3 shows one example of a control which is responsive to variations in the spacing "S" as will be described in more detail below. Two chassis components 2 are arranged along each side of one half of the vehicle body 3 as shown in FIG. 3. One valve 11 is provided for each pair of chassis components 2 for controlling the respective bellows means 10.1. Each valve 11 has a pot or cylinder 11.1 holding a rotary piston valve plug 11.2. Further, each valve housing is provided with an inlet port and an outlet port as well as with an exchange port or antechamber 11.3. The respective valve 11 is operated by a lever drive 14 which senses the changes in the spacing "S" and drives the valve plug 11.2 accordingly. Thus, depending on the direction of change in the spacing "S" the respective bellows 10.1 is either connected to a pressure container 12 or to a receiving container 13 for the filling fluid of the bellows. The receiving container 13 has a lower pressure relative to the pressure container 12 since a pump 15 is arranged between the two containers 12 and 13. Due to the pump 15 the fluid flow as indicated by the arrows 16 is assured, whereby the flow in the conduit 16' may be into the bellows 10.1 or out of the bellows 10.1.

As shown in FIG. 3 the valves 11 are illustrated in their rest position, whereby any fluid flow is blocked.

As illustrated in FIG. 3, the supporting spring bellows 10.1 forming the first spring means as mentioned above, are simultaneously utilized as control means for the bellows 8.1 of the second spring means for the levitation magnets 1.1, whereby the second bellows 8.1 are effective in the same direction. This arrangement has the advantage that a load compensation accomplished in the bellows 10.1 through the valves 11 simultaneously enforces a constant spacing "S'" between the levitation magnets 1.1 and the respective chassis component 2. For this purpose the filling fluid for the bellows 8.1 of the second spring means may be supplied through a valve 17 from the respective next adjacent bellows 10.1 of the first spring means which is effective with its spring action in the same direction as the bellows 8.1, namely, in the vertical direction.

The valves 17 are similar in structure to the valve 11 described above. In the valve 17 a piston 17.2 is also rotatable by means of a lever drive 18 which responds to the spacing "S'" between the levitation magnets 1.1 and the chassis components 2. Depending on the variation of the spacing "S" the corresponding bellows 8.1 may thus be connected either with the next adjacent bellows 10.1 of the first spring means or it may be connected to the respective return conduit 19 which in turn in connected to the receiving container 13. As described above, it is possible, by using the valves 17, to avoid larger differences in the position or location of the levitation magnets 1.1 relative to the chassis component 2 in case one of the levitation magnets should fail.

The invention, however, may also be practiced without the use of the valves 17, whereby the bellows 8.1 of the second spring means would be directly connected with the next adjacent bellows 10.1 which is effective in the same direction. In this instance or embodiment in which the bellows 8.1 are directly connected to the next adjacent bellows 10.1 the effective surface area of the bellows 10.1 should be as large as the sum of the effective surface areas of all the bellows 8.1 connected to the respective bellows 10.1. Contrary thereto, in the embodiment of FIG. 3 employing the valves 17 the effective surface area of the bellows 10.1 is smaller than the sum of all the effective surface areas of the bellows 8.1 The difference in the effective surface area is to be selected such that the pressure in the bellows 8.1 under normal operating conditions when there is equilibrium between the forces exerted by the first and second spring means, is smaller than the pressure which will establish itself in response to the failure of one of the magnets of a group of magnets supported by the bellows 8.1. In case of a failure of a magnet the valve 17, or rather the lever drive 18 of the adjacent bellows 8.1 will respond to the reduction in the spacing "S'" thereby increasing the pressure in the neighboring bellows 8.1, whereby the maintaining of the rated spacing between the magnets 1.1 and the chassis components 2 is automatically restored. Where the valves 17 are not used, that is where the bellows 8.1 are directly connected to the bellows 10.1 the effective surface areas are selected to be equal in order to assure the equilibrium between the forces.

Figure 4:
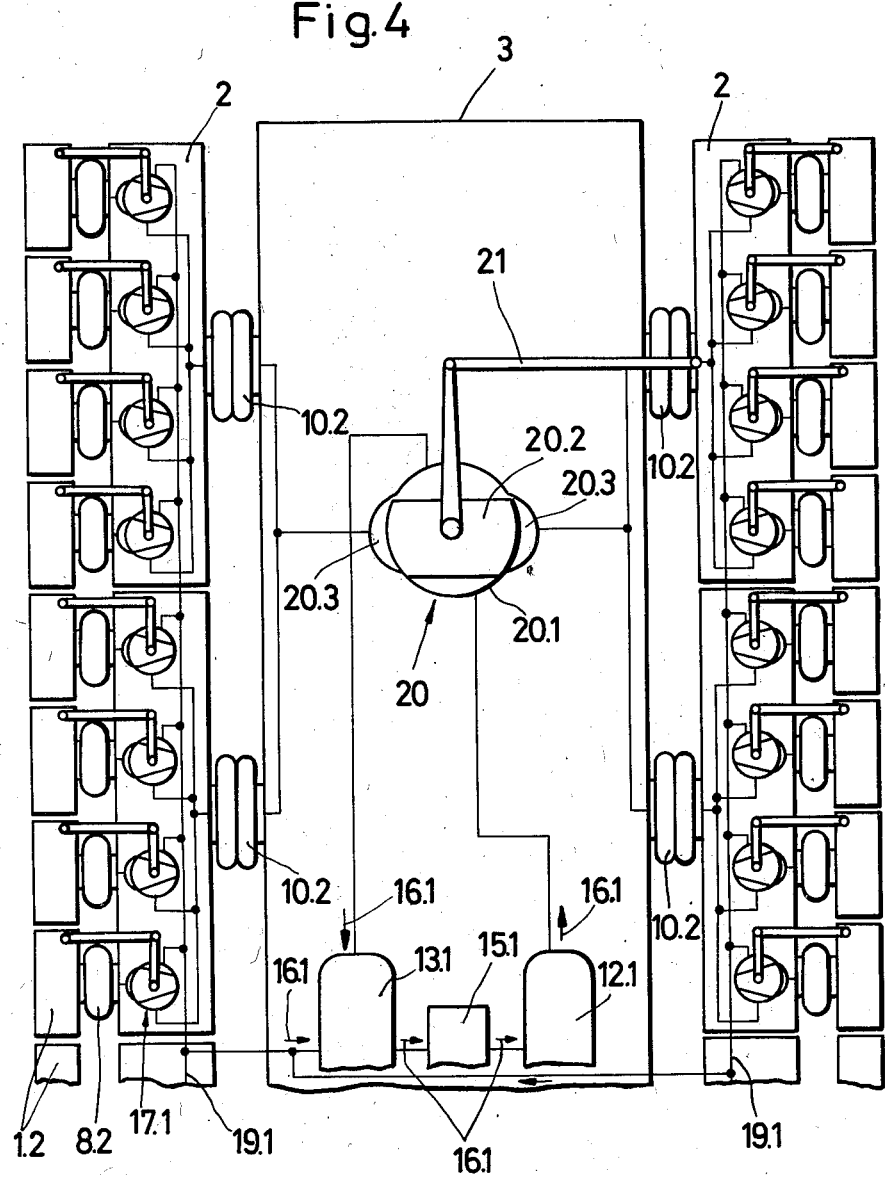

FIG. 4 illustrates a schematic diagram similar to that of FIG. 3, however showing the control of the bellows 8.2 which constitute the spring means for the guide magnets, through the bellows 10.2 which constitute the spring means for the lateral support of the vehicle body 3 as best seen in FIG. 2. The valves 17.1 are operatively connected in series with the bellows 10.2 to control the bellows 8.2. Otherwise the operation is the same as described above with reference to FIG. 3 except for the fact that instead of using two valves 11, FIG. 4 employs but one rotary piston valve 20 having a rotary piston 20.2 driven by a lever drive 21 for rotation responsive to variations in the rated lateral spacing between the body 3 and the chassis components 2. It is possible to use but one valve 20 in FIG. 4 because load changes take place in the horizontal direction only from one or the other side of the vehicle that is, either the load changes are effective from left to right or from right to left, but not simultaneously in both directions. The valve housing 20.1 comprises two exchange chambers 20.3 which communicate with each other in the rest position of the valve as illustrated in FIG. 4. As mentioned, the valve piston 20.2 is rotated by the lever drive 21 coupled to the forward chassis component 2. The biasing of the lateral guide bellows 10.2 is determined by the pressure level in a return fluid container 13.1 which is connected to the return conduits 19.1 of the valves 17.1 and which is further connected to a pump 15.1 which in turn is operatively connected to the pressure container 12.1. Thus, the filling fluid flows in the direction indicated by the arrow 16.1. The filling fluid may be a gas such as air or a liquid such as pressurized oil.

In connection with FIGS. 3 and 4 it will be noted that two chassis components are illustrated on each side of one half of the vehicle body 3. This is merely for the purpose of simplifying the illustration. In fact, each chassis component 2 extends across the entire width of the respective vehicle body as shown in FIG. 2. However, it should be noted in this connection that the invention may equally be employed in magnetically levitated vehicles in which separate chassis components are arranged along each side of the vehicle body.

Although the invention has been described with reference to specific example embodiments, it will be appreciated, that it is intended, to cover all modifications and equivalents within the scope of the appended claims.

What is claimed is:

1. An apparatus for supporting a magnetically levitated vehicle, comprising chassis means, a vehicle body, first spring means supporting said vehicle body relative to said chassis means, magnet means for providing magnetic forces, second spring means securing said magnet means to said chassis means, said first and second spring means comprising respective first and second fluid filled bellows means and means operatively connected to said first and second fluid filled bellows means for adjusting the fluid in said second bellows means in response to the fluid in said first bellows means, said adjusting means comprising valve means operatively interconnecting said first and second bellows means, and valve control means operatively connected to the respective valve means, said valve control means being responsive to spacing variations of the respective one of said magnet means relative to said chassis means whereby the fluid quantity or volume in said second bellows means may be increased out of the next respective one of said first bellows means, said apparatus further comprising fluid source means operatively connected to said first bellows means, and return flow conduit means operatively connecting said valve means to said fluid source means.

2. The apparatus of claim 1, wherein said means for adjusting are controlling the fluid pressure or volume in said second bellows means in response to the fluid pressure or volume in said first bellows means.

3. The apparatus of claim 1, wherein said magnetic forces of said magnet means have substantially vertically effective support components and substantially horizontally effective guide components.

4. The apparatus of claim 1, wherein said respective one of said first bellows means comprises an effective surface area of a given size, and wherein said second bellows means comprise a plurality of second bellows members each having an effective surface area such that said surface area of given size is smaller than the sum of the effective surface areas of the second bellows members operatively connected to said first bellows means.

5. The apparatus of claim 1, comprising further valve means and further valve control means for said further valve means, said further valve control means comprising first lever drive means operatively connected to said further valve means and responsive to spacing variations between said vehicle body and said chassis means, said first mentioned valve control means comprising lever drive means operatively connected to said first mentioned valve means and responsive to spacing variations between said magnet means and said chassis means, said further valve means controlling the flow of fluid from said fluid source means to said first bellows means, said first mentioned valve means controlling the flow of fluid from said first bellows means to said second bellows means.

6. The apparatus of claim 5, wherein said further valve means permit a return flow from said further bellows means back to said fluid source means, and wherein said first mentioned valve means permit a return flow from said second bellows means back to said fluid source means.

7. The apparatus of claim 5, wherein said first mentioned and further valve means are rotary piston valve means.

8. The apparatus of claim 7, wherein said first mentioned and further valve means each have an inlet port and an outlet port as well as a fluid exchange port.

9. The apparatus of claim 7, wherein said further valve means have an inlet port and an outlet port and two fluid exchange ports.

10. The apparatus of claim 1, wherein said magnet means comprise levitation magnets, and guide magnets, said apparatus further comprising carrier means for said levitation magnets and for said guide magnets, said carrier means comprising respective channel means for holding the corresponding magnet, and blade springs for securing the channel means to said chassis means, said blade springs comprising a first pair of blade springs for holding the channel means of the guide magnets and a second pair of blade springs for holding the channel means of the levitation magnets, said first pair of blade springs extending substantially vertically, said second pair of blade springs extending at an acute angle to the horizontal, whereby the blade springs form substantially a W in the sectional view.

11. The apparatus of claim 10, wherein said second bellows means are located in said carrier channel means, said apparatus further comprising rail means operatively interposed between said second bellows means and the respective one of said magnets.

* * * * *